United States Patent
Sann et al.

(10) Patent No.: US 7,279,091 B2
(45) Date of Patent: Oct. 9, 2007

(54) FILTER DEVICE

(75) Inventors: Norbert Sann, Riegelsberg (DE); Werner Wilkendorf, Ottweiler (DE)

(73) Assignee: Hydac Filtertechnik GmbH., Sulzbach/Saar (DE)

( * ) Notice: Subject to any disclaimer, the term of this patent is extended or adjusted under 35 U.S.C. 154(b) by 270 days.

(21) Appl. No.: 10/467,365

(22) PCT Filed: Jan. 12, 2002

(86) PCT No.: PCT/EP02/00250

§ 371 (c)(1),
(2), (4) Date: Nov. 25, 2003

(87) PCT Pub. No.: WO02/062447

PCT Pub. Date: Aug. 15, 2002

(65) Prior Publication Data

US 2004/0074827 A1 Apr. 22, 2004

(30) Foreign Application Priority Data

Feb. 8, 2001 (DE) ................................. 101 05 612

(51) Int. Cl.
*B01D 35/14* (2006.01)

(52) U.S. Cl. .................... 210/130; 55/315; 55/323; 210/132; 210/315; 210/338; 210/433.1

(58) Field of Classification Search ............. 210/130, 210/132, 315, 316, 418, 420, 337, 338, 433.1, 210/435, 450; 55/315, 323, 486–489
See application file for complete search history.

(56) References Cited

U.S. PATENT DOCUMENTS

| 3,000,505 A | | 9/1961 | Scavuzzo |
| 3,113,925 A | * | 12/1963 | Rosaen ........................ 210/315 |
| 3,216,571 A | * | 11/1965 | Whiting et al. ............... 210/90 |
| 3,270,884 A | | 9/1966 | Bremer |
| 3,467,256 A | * | 9/1969 | Humbert, Jr. et al. ...... 210/132 |
| 4,264,344 A | * | 4/1981 | Ludecke et al. .............. 55/313 |
| 4,692,175 A | | 9/1987 | Frantz |
| 5,888,383 A | | 3/1999 | Cox |
| 5,922,199 A | * | 7/1999 | Hodgkins ................... 210/256 |
| 6,117,312 A | | 9/2000 | Mees et al. |

FOREIGN PATENT DOCUMENTS

| DE | 19546440 | 6/1997 |
| FR | 1415943 | 10/1965 |
| GB | 1441269 | 6/1976 |
| WO | 9921637 | 5/1999 |

* cited by examiner

*Primary Examiner*—Joseph Drodge
(74) *Attorney, Agent, or Firm*—Roylance, Abrams, Berdo & Goodman, L.L.P.

(57) ABSTRACT

A filter device has a filter housing (10) receiving a first filter element (12), through which a medium may flow in a given direction, and has a bypass device (22). Along with the first filter element (12), a second filter element (32) is provided. The filter elements are arranged in series, one behind the other, in the direction of flow. When the bypass device (22) is activated, the second filter element (32), immediately following in the direction of flow, filters the medium. The second filter element thus takes over the main filtration of the medium on actuation and operation of the bypass device, since the first filter element is essentially no longer available for a filtration process due to the bypass device.

20 Claims, 1 Drawing Sheet

FILTER DEVICE

FIELD OF THE INVENTION

The present invention relates to a filter device having a filter housing with a first filter element located therein and through which a medium flows with a definable direction, and having a bypass device.

BACKGROUND OF THE INVENTION

Comparable filter devices (see, e.g., FR-A-1 415 943 and U.S. Pat. No. 3,000,505) are known in a plurality of embodiments and sizes. Within the filter housing, generally at least one hollow-cylindrical filter element removes impurities from fouled liquid supplied through an inlet into the filter housing. Flow takes place through the respective filter element from the outside to the inside. The filtering filter mat of the filter element is supported along a support tube provided with passages. The liquid which has been filtered in this way is then drained through an outlet in the filter housing for further use. The longer the filter element is in operation for filtration, the more it is clogged by dirt until finally the filter element forms an almost impassable barrier for the fluid flow (medium) and the fluid flow no longer reaches the outlet side of the filter housing. To avoid interruption of the fluid flow, which may result in the shutdown of an entire hydraulic system, for example, DE 195 46 440 A1 has suggested providing within the filter device with the filter housing a bypass valve as a bypass device. The bypass device has a spring-loaded closing part which finally opens with increasing fluid pressure within the filter housing and opens a fluid-carrying path with disconnection of the filter element directly from the inlet to the outlet. The fluid or the medium consequently no longer flows through the filter element with a definable radial direction, but moves outside the filter element essentially in the axial flow direction in the space between the outside periphery of the filter element and the inside periphery of the filter housing. The fluid flow deflected in this way then passes via the bypass valve without a filtration process through the interior of the filter element and is discharged to the outlet point. These bypass valves or other comparable bypass device are accordingly used for operating reliability and to prevent unwanted pressure rises. Unwanted pressure rises can otherwise lead to damage within the hydraulic system.

U.S. Pat. No. 5,888,383 discloses a generic filter device with a filter housing and a first filter element located in it. The first filter element extends along the middle lengthwise axis of the filter housing, through which flow of a medium takes place with a definable direction from one fluid inlet to one fluid outlet. A bypass device (bypass valve) is provided in addition to the first filter element along with another, second filter element. The respective filter elements are located in succession in the flow direction. When the bypass device takes effect, the other filter element which directly follows in the flow direction undertakes filtration of the medium. The first filter element extends essentially over the entire structural length of the filter housing. The second filter element projects with its end cap with a reduced overall length into the one filter element.

The embodiment of FIG. 2 of U.S. Pat. No. 5,888,383 moreover discloses a first filter element with high filter mesh fineness and a second filter element projecting into it with a coarser filter mesh fineness. This arrangement results in the first filter element lying to the outside primary filtration for fine filtration undertaken. Only when the first filter element has been clogged by dirt does the bypass device (bypass valve) open for the second filter element following in the flow direction to undertake coarse filtration of the medium such that in any case damage to the following hydraulic circuit is precluded.

In the known approach, the installation length of the second filter element extends essentially over the entire length of the first filter element. The outside periphery of the second filter element on the filter mat structure side is surrounded by a closed cylindrical protective jacket. On its bottom side, the protective jacket faces the fluid inlet and outlet which in the axial direction toward the middle lengthwise axis of the filter housing enter the latter on the bottom side. The second filter element has a radial distance over which the fluid to be filtered, originating from the bypass device (bypass valve), is delivered to coarse filtration by the second filter element. The indicated protective jacket stiffens the second filter element so that it is for the most part stable relative to pressure peaks, especially also relative to the fluid inlet side. Otherwise, the indicated protective jacket prevents unwanted washing out of the dirt particles collected in the second filter element onto the clean side of the filter device. Solely due to the protective jacket and the axial alignment of the fluid inlets parallel to the middle lengthwise axis of the filter housing unfavorable flow conditions arise. This arrangement adversely affects filtration performance with the known device in normal filter operation. The attachment of the protective jacket requires on the one hand installation space within the filter device and on the other hand leads to corresponding additional costs in production and maintenance.

SUMMARY OF THE INVENTION

Objects of the present invention are to provide an improved filter device with a bypass device, while maintaining the advantages in the prior art. Specifically, even in the case of triggering of the bypass device (bypass), damage of any type to the overall hydraulic system is avoided such that an especially compressively-still structure for the entire filter element configuration is ensured, and such that the flow conditions in filter operation are favorable with simultaneously low production and maintenance costs.

These objects are achieved by a filter device where the second filter element has an installation length which is shortened by at least one-half compared to the first filter element. Because the second filter element projects into the first filter element to the extent that its top end cap lies essentially in one plane transversely to the middle lengthwise axis with the top end of the fluid inlet which extends laterally through the filter housing, there is an especially compressively-still structure for the entire filter element configuration with respect to the radial inflow of the medium to be filtered by way of the fluid inlet. Since this compressively-stiff structure is implemented without further aids, such as a protective jacket or the like, the production costs and maintenance costs are reduced accordingly when the filter elements are replaced by new ones. The medium to be filtered flows through the first filter element essentially in the radial direction, originating from the fluid inlet on the side filter housing, and travels filtered to the other, second filter element. As a result of the radial direction of flow through the filter elements the flow conditions are favorable for the fluid which is to be filtered within the filter element system. Furthermore, the pertinent configuration with different overall lengths enables compact accommodation of the bypass valve in the end area of the first filter element.

The configuration is such that with the triggering and opening of the bypass device (bypass), the second filter element directly undertakes filtration of the fouled medium, so that primary filtration shifted to the second filter element can take place at the same time. Connecting the two filter elements in succession in the conventional flow direction of the medium moreover ensures that in case of failure of the first filter element, which is otherwise available for primary filtration, for example, in the case of bursting or when the filter mat tears or the like, the following second filter element ensures filtration so that in the pertinent case dirt cannot enter the hydraulic circuit and cause damage. These safety functions play an important role, especially when these filter elements are used in the area of bearing lubrication in wind power plants, in high rotation paper printing machines or the like.

In one especially preferred embodiment of the filter element of the present invention, the first filter element has higher filter mesh fineness than the second filter element. The first filter element in the flow direction is therefore able to remove both extremely fine and also coarse dirt from the fluid flow and the medium. In case of failure it is then at least possible to separate the coarse dirt from the fluid flow by the second filter element.

In another, especially preferred embodiment of the filter device of the present invention, the two filter elements are arranged coaxially relative to one another, and extend along the middle lengthwise axis of the filter housing. This arrangement yields an overall filter device with a very compact structure. Also, the two filter elements can be easily and quickly replaced in the sense of a modularly structured replacement set as a whole. This capability reduces production costs and also maintenance costs.

The bypass device preferably is a bypass valve which has a spring-loaded closing part. In its closed position, the closing part blocks the fluid-carrying path within the two filter elements from one fluid inlet within the filter housing to the fluid outlet located therein and otherwise clears it. The bypass device could otherwise be formed from some other blocking part, a chock point or the like. Preferably, for adjusting the pretensioning of the spring and the opening force for the closing part, a setting means acts on the effective length of the respective closing spring.

In addition to the two indicated filter elements, a third or additional filter element could be used. Such filter element would come before or upstream in the flow direction having a bypass device and the filter mesh fineness accordingly decreasing from the preceding filter element to the following filter element. A finer filter element is therefore always connected upstream of the coarser filter element in the conventional flow direction.

When using two filter elements, it has proven especially advantageous to provide the first filter element with a filter mesh fineness of 10 µm and to equip the second filter element which follows in the flow direction with a filter mesh fineness of approximately 200 µm.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
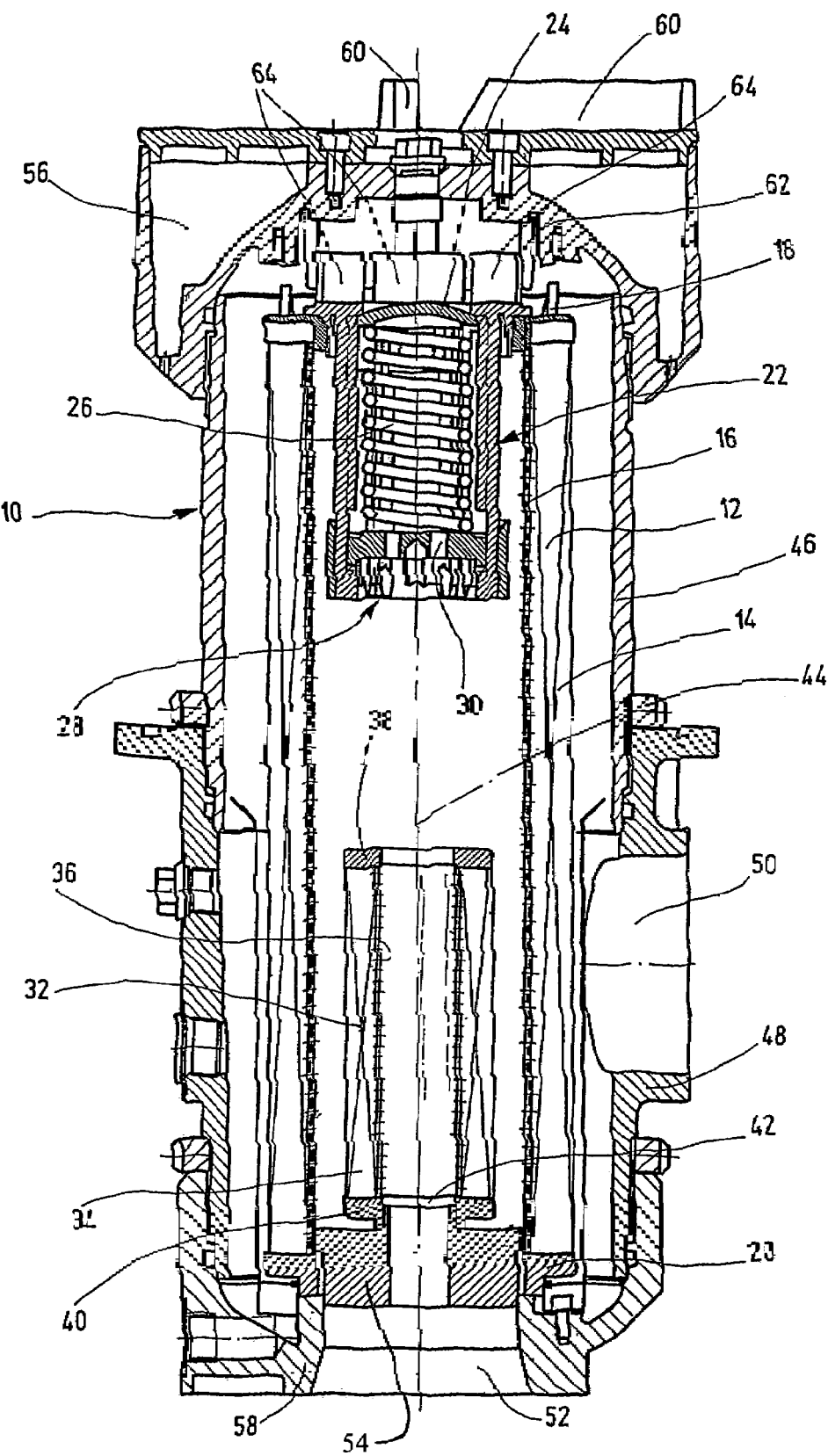
FIG. 1 is a schematic, not-to-scale, side elevational view partially in projection and partially in section of a filter device according to an embodiment of the present invention.

The filter device has a filter housing 10 receiving a first filter element 12. The filter element 12 forms a hollow cylinder. Its filter mat 14 is pleated in the conventional manner (not shown), and encompasses a support tube 16 with fluid passages. The support tube 16 itself is made as a hollow cylinder. The support tube configuration ensures that, for the direction of flow through the first filter element 12 from the outside to the inside, the filter mat 14 can be effectively supported on the support tube 16 and, for example, does not bulge to the inside and possibly begin to tear. On the two ends of the filter element 12, the filter element is provided with end caps 18 and 20, by way of which the filter element 12 is held within the filter housing 10. The respective end caps 18 and 20 are connected fluid-tight to one another by way of the corresponding cementing and/or sealing means with the free ends of the support tube 16 and of the filter mat 14 of the first filter element 12.

As is to be seen in FIG. 1, within the filter device and in the area of the top end of the first filter element 12, a bypass device in the manner of a bypass valve is designated as a whole as 22. It has a dome-shaped closing part 24 on which a closing spring 26 acts. The closing spring 26 is a compression spring which keeps the closing part 24 in closing contact with a definable closing force with pretensioning. The cylindrical closing spring 26 is a helical spring, and has an essentially linear spring characteristic. It can also have a progressive characteristic if made conical. In addition, a plurality of spring elements (not shown) can be arranged in succession or connected in parallel by one closing spring surrounding the other one on the peripheral side to keep the closing part 24 in the unactuated position of the bypass device 22 in the closed position.

To adjust the spring pretension and the opening force for the closing part 24, an adjustment means 28 changes the spring length and the degree of effectiveness of the closing spring 26. For incremental adjustment of the pretensioning of the spring, the adjustment means 28 has a locking ring 30 which can be moved along the retaining rods of a retaining cage and which can be locked to them in definable catch positions. The length of the closing spring 26 is fixed in the unactuated state of the bypass valve or the bypass device 22 by the distance between the closing part 24 and the top of the locking ring 30. By moving the locking ring 30 into the other catch position, the distance and consequently the closing characteristic for the closing part 24 change. Conversely, with only one bypass device 22 a plurality of given pressure ranges for the pertinent filter devices can be covered. The bypass valve with its catch and locking possibilities is fundamentally known and described comprehensively in DE 195 46 440 A1 so that it is not detailed here. The bypass valve or the bypass device 22 is described below only to the extent that it is necessary for the understanding of the present invention.

In addition to the first filter element 12, within the filter housing 10 another or second filter element 32 is provided.

The filter elements 12 and 32 are located in succession in the flow direction, as shown. The second filter element 32 follows directly in the flow direction performing solely filtration of the medium (fluid flow) when the bypass device 22, in the form of the bypass valve, takes effect, i.e., when the closing part 24 is opened.

To ensure efficient operation of the filter device, the first filter element 12 has higher filter mesh fineness than the second filter element 32. In other words, the first filter element 12 performs both fine and also coarse filtration of the medium, i.e., dirt with both large and small particle sizes is filtered out of the flow of media. The medium flows through the first filter element 12 essentially in the radial direction and travels filtered in this way to the second filter element 32 with less filter mesh fineness compared to the first filter element 12. In the pertinent operating situation, the second filter element 32 does not constitute a significant flow barrier for the already filtered medium, since the filter mesh fineness of the second filter element 32 is not sufficient to offer an essentially high flow resistance to the flowing medium. The fluid medium which has already been effectively cleaned by the first filter element 12 therefore penetrates the second filter element 32 essentially unobstructed.

In terms of its basic concept, the second filter element 32 is built comparably to the first filter element 12, i.e., the second filter element 32 likewise has a preferably pleated filter mat 34 surrounding a support pipe 36 with fluid passages. Furthermore, the two ends of the second filter element 32 are terminally encompassed by comparable end caps 38 and 40. The top end cap 38 in FIG. 1 is completely closed. Conversely the lower, second end cap 40 has a passage point 42 for the filtered medium.

As FIG. 1 shows, the two filter elements 12 and 32 are located coaxially to one another and extend along the middle lengthwise or longitudinal axis 44 of the filter housing 10. The bypass device 22 (bypass valve) is likewise made essentially rotationally symmetrical, with the middle axis of the bypass device 22 being essentially congruent with the middle lengthwise axis 44 of the filter housing 10.

The first filter element 12 extends essentially over the entire length of the filter housing 10. The second filter element 32 has an installation length which is shortened conversely by at least one-half. The filter housing 10 in its central area has two housing pipe sections 46 and 48 connected to one another in the conventional manner to close the interior of the filter housing fluid-tight relative to the environment. The lower housing pipe section 48 on its right side has a fluid inlet 50, and on its bottom has a fluid outlet 52 located coaxially to the middle lengthwise axis 44 of the filter housing 10.

The fouled filter medium flows into the filter device via the fluid inlet 50 and travels cleaned, i.e., filtered, from the fluid outlet 52 into the remaining hydraulic circuit (not shown) to which the filter device is connected. The second filter element 32 projects into the first filter element 12 to the extent that its top end cap 38 lies essentially in one plane transversely to the middle lengthwise axis 44 with the top end of the filter inlet 50, as viewed in FIG. 1. This configuration yields an especially compressively-stiff structure for the entire filter element relative to the inflow of the medium to be filtered via fluid inlet 50. The fluid inlet 50 is made in the manner of a connecting flange to facilitate connection of the pipework or the like. Furthermore, by way of the fluid inlet 50, it is also possible to connect the filter device as an attachment to a hydraulic system at a later time. The second filter element 32 on its end opposite the free end is supported by a plate-like holding means or holder 54 which closes the fluid outlet of the filter device in the filter housing 10 except for the passage point 42 and except for the fluid outlet 52.

The filter housing 10 with its two housing pipe sections 46 and 48 is closed on the end side by cap-like pipe end sections 56 and 58. The lower pipe end section 58 encompasses on the outer peripheral side of the lower housing pipe section 48 and it can be screwed onto it to form a seal. The lower pipe end section 58 accordingly also clears the fluid outlet 52 to the outside and forms a connecting point for subsequent pipework, which is not detailed, or for another connection possibility. The top pipe end section 56 is provided with a handling aid in the form of handling links 60 on its free top side which facilitate screwing and unscrewing of the top pipe end section 56. On its inside, the pipe end section 56 is provided with segment-like load transmission links 62 which project down and which in the area of the top end of the bypass device 22 can be brought into contact with it. When the pipe end section 46 is screwed onto the top housing pipe section 46, the load transmission links 62 press the first filter element 12 downwardly when viewed in the line of sight of FIG. 1. In this way, its position in the lower filter element receiver of the filter housing 10 is ensured.

The load transmission links 62 are preferably interconnected in the manner of a ring body and accordingly can be made in one piece. They surround contact segments 64 so that not only in the axial direction, but also in the radial direction transversely to the middle lengthwise axis 44, accurate guidance of the filter element 12 is achieved in the fixing process. By unscrewing the top pipe end section 56, both the first filter element 12 and the second filter element 32 can be easily changed, and with the corresponding fouling to replace the pertinent filter elements 12 and 32 with new elements. The bypass device 22 in the manner of a bypass valve can be maintained as a part which is less subject to wear and can be integrated accordingly into a first filter element 12 which is to be newly inserted. Moreover, it is possible, except for the filter elements 12 and 32, to obtain the other components of the filter device. This arrangement reduces maintenance costs. This structure enables simple handling and facilitates maintenance of the pertinent devices.

For the sake of better understanding, the manner of operation of the filter device is described below. The fouled fluid or filter medium enters the interior of the filter housing 10 via fluid inlet 50. The filter medium then flows through first filter element 12 essentially in the radial direction. The dirt in the filter medium remains in the pleated filter mat 14 of the filter element 12. The first filter element 12 has a filter mesh fineness of preferably 10 μm (equals particle diameter) so that both fine and also coarse dirt is captured by the filter element 12. The filter medium which has been filtered in this way then flows through the passages in the support pipe 16 into the interior of the first filter element 12. The second filter element 32 designed to be coarser then essentially does not constitute a flow barrier. The cleaned fluid flows through the filter mat 34 of the second filter element 32 in the radial direction. Emergence takes place from the filter device for the cleaned filter by way of the passage point 42 and the fluid outlet 52. The filtered medium then is available for recirculation in a hydraulic system or the like. In addition to the aforementioned fluids, also gases, polymer melts or the like can be cleaned in this way optionally with filter elements which have been made differently and appropriately (not shown).

If, at this point with continuing use of the filter device, the filter mat 14 of the first filter element 12 is clogged by dirt, an increased differential pressure is formed outside and inside of the first filter element 12. At a definable threshold value determined by the closing force of the closing spring 26, the closing part 24 of the bypass valve which represents the bypass device 22 opens. The filter medium which is no longer cleaned essentially flows through the bypass device 22 and into the interior of the filter element 12. In this case, the second filter element 32 performs primary filtration, i.e., the uncleaned filter medium passes through its pleated filter mat 34 and is cleaned. Since the second filter element 32 has a much coarser filter mesh fineness structure, only coarse dirt is captured and dirt with extremely small particles can enter the hydraulic circuit. As a result of coarse filtration, the extremely fine particles passing as dirt cannot disrupt or adversely affect operation of the hydraulic system (lubricant circuit or the like).

The filter devices can be provided with differential pressure displays so that when the differential pressure threshold value is reached and the bypass device 22 opens, an alarm or warning signal is delivered. This signal enables maintenance personnel to specifically replace the fouled filter element 12. With the filter device of the present invention, it is ensured that dirt which becomes dangerous at any rate can be kept away from the hydraulic circuit.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
    a filter housing having a longitudinal axis, having a housing wall coaxial to said longitudinal axis, and having a fluid inlet and a fluid outlet defining a flow direction therein, said fluid inlet extending laterally through said housing wall;
    a first filter element within said filter housing extending along said longitudinal axis and having a first length essentially along an entire length of said filter housing;
    a bypass device within said filter housing openable to allow flow in said flow direction without filtration through said first filter element; and
    a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet, said first filter element having a first end adjacent to and encompassing said bypass device and an opposite second end adjacent to and encompassing said second filter element with a radial distance therebetween, said second filter element having an end opposite said top end cap supported on a plate holder closing said fluid outlet except for a passage in said plate holder.

2. A filter device according to claim 1 wherein
    said first filter element has a higher filter mesh fineness than said second filter element.

3. A filter device according to claim 1 wherein
    said first and second filter elements are coaxial to one another along said longitudinal axis.

4. A filter device according to claim 1 wherein
    said bypass device is a bypass valve having a closing part movable between open and closed positions opening and closing a flow path from said fluid inlet to said second filter element without passing through said first filter element, respectively, and biased towards said closed position by a spring.

5. A filter device according to claim 4 wherein
    said bypass valve comprises an adjustment device for varying pretensioning of said spring and opening forces for said closing part by varying lengths of said spring.

6. A filter device according to claim 1 wherein
    said filter housing comprises first and second pipe sections connected to one another, and ends closed by pipe end sections.

7. A filter device according to claim 1 wherein
    said first filter element has a first mesh fineness of 3 μm to 30 μm; and
    said second filter element has a second mesh fineness of 50 μm to 400 μm.

8. A filter device according to claim 7 wherein
    said first mesh fineness is 10 μm to 30 μm; and
    said second mesh fineness is 200 μm.

9. A filter device according to claim 1 wherein
    said fluid inlet is located-axially between opposite ends of said first filter element.

10. A filter device, comprising:
    a filter housing having a longitudinal axis and having a fluid inlet and a fluid outlet defining a flow direction therein, said fluid inlet extending laterally through said filter housing;
    a first filter element within said filter housing extending along said longitudinal axis and having a first length essentially along an entire length of said filter housing;
    a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet; and
    a bypass device within said filter housing openable to allow flow in said flow direction without filtration through said first filter element, said bypass device being a bypass valve having a closing part movable between open and closed positions opening and closing a flow path from said fluid inlet to said second filter element without passing through said first filter element, respectively, and biased towards said closed position by a spring.

11. A filter device according to claim 10 wherein
    said first filter element has a higher filter mesh fineness than said second filter element.

12. A filter device according to claim 10 wherein
    said first and second filter elements are coaxial to one another along said longitudinal axis.

13. A filter device according to claim 10 wherein
    said bypass valve comprises an adjustment device for varying pretensioning of said spring and opening forces for said closing part by varying lengths of said spring.

14. A filter device according to claim 10 wherein
    said first filter element has a first end adjacent to and encompassing said bypass device and an opposite second end adjacent to and encompassing said second filter element with a radial distance therebetween.

15. A filter device according to claim 14 wherein
    said second filter element comprises an end opposite said top end cap supported on a plate holder closing said fluid outlet except for a passage in said plate holder.

16. A filter device according to claim 10 wherein
said filter housing comprises first and second pipe sections connected to one another, and ends closed by pipe end sections.

17. A filter device according to claim 10 wherein
said first filter element has a first mesh fineness of 3 μm to 30 μm; and
said second filter element has a second mesh fineness of 50 μm to 400 μm.

18. A filter device according to claim 17 wherein
said first mesh fineness is 10 μm to 30 μm; and
said second mesh fineness is 200 μm.

19. A filter device according to claim 10 wherein
said fluid inlet extends laterally through a vertical side of said filter housing, and is located axially between opposite ends of said first filter element.

20. A filter device, comprising:
a filter housing having a longitudinal axis, having a housing wall coaxial to said longitudinal axis, and having a fluid inlet and a fluid outlet defining a flow direction therein, said fluid inlet extending laterally through said housing wall;
a first filter element within said filter housing extending along said longitudinal axis and having a first length essentially along an entire length of said filter housing;
a bypass device within said filter housing openable to allow flow in said flow direction without filtration through said first filter element; and
a second filter element within said filter housing and said first filter element downstream of said first filter element in said flow direction having a second length not greater than one-half of said first length, said second filter element having a top end cap lying essentially in one plane extending transversely to said longitudinal axis with a top end of said fluid inlet, said bypass device being a bypass valve having a closing part movable between open and closed positions opening and closing a flow path from said fluid inlet to said second filter element without passing through said first filter element, respectively, and biased towards said closed position by a spring.

* * * * *